United States Patent [19]

Rhodes

[11] Patent Number: 5,797,725
[45] Date of Patent: Aug. 25, 1998

[54] GAS TURBINE ENGINE VANE AND METHOD OF MANUFACTURE

[75] Inventor: Jeffrey F. Rhodes, Zionsville, Ind.

[73] Assignee: Allison Advanced Development Company, Indianapolis, Ind.

[21] Appl. No.: 862,837

[22] Filed: May 23, 1997

[51] Int. Cl.$^6$ ................................................. F04D 29/44
[52] U.S. Cl. ................................ 415/209.2; 415/209.4
[58] Field of Search .......................... 415/209.1, 209.2, 415/209.3, 209.4

[56] References Cited

U.S. PATENT DOCUMENTS

| | | |
|---|---|---|
| 1,620,974 | 3/1927 | Klenk . |
| 2,117,107 | 5/1938 | Soderberg . |
| 3,019,512 | 2/1962 | Stalker . |
| 3,070,353 | 12/1962 | Welsh .................. 415/209.2 |
| 3,745,628 | 7/1973 | Stahl . |
| 3,909,157 | 9/1975 | Wachtell et al. ........... 415/209.2 |
| 4,305,696 | 12/1981 | Pask ........................ 415/209.2 |
| 4,602,411 | 7/1986 | Brown . |
| 4,812,107 | 3/1989 | Barcella et al. . |
| 4,940,386 | 7/1990 | Feuvrier et al. ............ 415/209.2 |
| 5,046,246 | 9/1991 | Shepard et al. . |
| 5,174,715 | 12/1992 | Martin . |
| 5,332,360 | 7/1994 | Correia et al. . |
| 5,564,897 | 10/1996 | Mansson .................. 415/209.2 |
| 5,601,407 | 2/1997 | Humhauser ............... 415/209.3 |
| 5,630,700 | 5/1997 | Olsen et al. ............... 415/209.2 |
| 5,690,469 | 11/1997 | Deal et al. ................ 415/209.2 |

*Primary Examiner*—John T. Kwon
*Attorney, Agent, or Firm*—Woodard, Emhardt, Naughton Moriarty & McNett

[57] ABSTRACT

A gas turbine engine vane and method of manufacture. In one form of the present invention a vane is non destructively removeable from a vane segment to allow individual components to be replaced. The vane and endwalls are coupled together by a retainer that is formed in place between the vane and the endwall and that can be removed by conventional techniques. In one form the retainer fills a pair of corresponding grooves in the vane and endwall member so as to mechanically couple the components together and minimize fluid leakage therebetween. The retainer being nonmetallurgically coupled to the vane and endwall member. A portion of the vane being allowed to move relative to the endwall in response to thermal conditions.

53 Claims, 7 Drawing Sheets

GAS TURBINE ENGINE VANE AND METHOD OF MANUFACTURE

BACKGROUND OF THE INVENTION

The present invention relates generally to the design and construction of a vane for use in a gas turbine engine. More particularly, the present invention has one application wherein an airfoil is removeably coupled, but not bonded to an endwall. Although the present invention was developed for use in a gas turbine engine, certain applications may be outside of this field.

A gas turbine engine is typical of turbo machinery in which the concept described herein may be advantageously employed. It is well known that a gas turbine engine conventionally comprises a compressor for compressing a gas to the proper pressure required for supporting combustion of fuel in a combustion chamber. The high temperature gas exiting the combustion chamber provides the working fluid for the turbine and provides the work to power the compressor. A power turbine that is driven by the flow of high temperature gas is utilized to turn a propeller, fan or other device. Further, in other applications the high temperature gas may be used directly as a thrust for providing motive power, such as in a turbine jet engine.

It is well known that the performance of a gas turbine engine increases with an increase in the operating temperature of the high temperature gas delivered from the combustion chamber. These increased temperatures create a hostile environment that is detrimental to the structural integrity of many of the components of the gas turbine engine, including the vanes.

Vanes are generally utilized to direct the hot gaseous flow exiting from the combustor to the rotor blades within the high pressure turbine in order to extract energy therefrom. A plurality of circumferentially spaced vanes are coupled together to define a turbine nozzle. The turbine nozzle is typically assembled from a plurality of arcuate vane segments, wherein the vane segments each have one or more vanes per segment that are coupled to an endwall. Conventionally the vane segments are joined together to collectively form a 360 turbine nozzle. The location of the nozzle within the hot gaseous flow stream subjects the vanes to significant stress which can lead to failure modes or the vanes prior to the failure of the endwall.

Gas turbine engine designers typically try to reduce the loose part count in the engine. More specifically, the reduction of the loose part count in the nozzle involves having multiple vanes in a vane segment. By reducing the loose part count in the nozzle the engine designer strives to reduce fluid leakage and the wear of parts. A common limitation associated with many prior nozzle designs is that the vanes within a vane segment cannot be independently replaced. Prior designers of vane segments have utilized vanes integrally cast with endwalls, vanes metallurgically bonded to endwalls, and other techniques that do not allow the separation and replacement of the vane from the endwall without damaging one of the components. Therefore, the prior vane segment designs require the disposal of the entire vane segment when only one of the vanes has failed.

Even with the variety of earlier designs there remains a need for an improved, repairable vane segment. The present invention satisfies this need in a novel and unobvious way.

SUMMARY OF THE INVENTION

One form of the present invention contemplates a gas turbine engine vane, comprising: a wall member, and an airfoil having an outer surface extending between a leading edge and a trailing edge and between a first end and an opposite other second end, the airfoil having a first portion and a second portion along one of the ends, the first portion fixedly coupled to the wall member and the second portion being moveable relative to the endwall.

Another form of the present invention contemplates a gas turbine engine vane, comprising: an airfoil having an outer surface extending between a leading edge and a trailing edge and between a first end and an opposite other second end, the airfoil having a first groove therein at one of the ends extending along at least a portion of the outer surface between the leading edge and the trailing edge, an endwall having a second groove therein, the endwall positioned proximate the airfoil so that the first and second grooves are substantially in registry, and a retainer filling the grooves and extending between the airfoil and the endwall for coupling but not bonding the airfoil with the endwall.

Another form of the present invention contemplates a method for assembling a vane segment, comprising: providing an airfoil having an outer surface extending between a first end and an opposite other second end and having a first groove therein at one of the ends, further providing a wall member having a second groove therein, positioning the wall member and one of the ends of the airfoil so that the first and second grooves are substantially in registry, and placing a retainer adaptable to the shape of the grooves within the grooves for coupling but not bonding the airfoil to the endwall.

One object of one form of the present invention is to provide an improved vane for a gas turbine engine.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
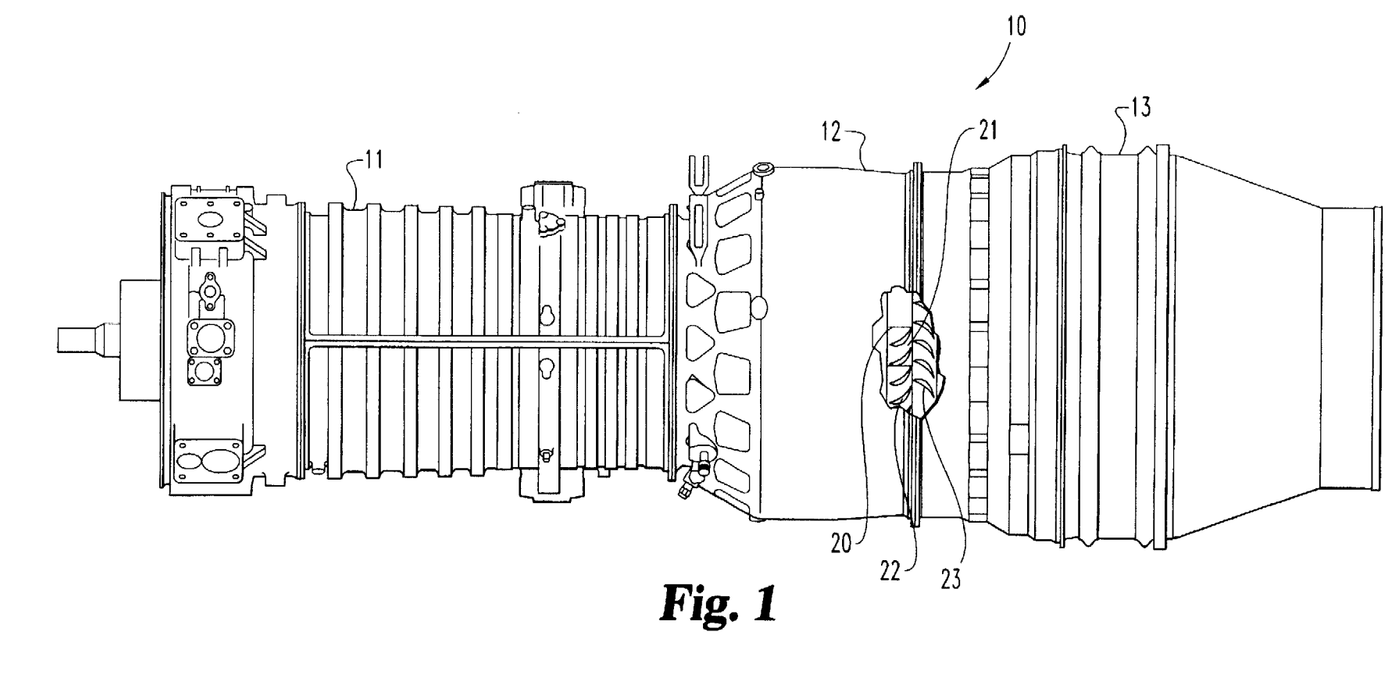
FIG. 1 is a partially fragmented side elevational view of a gas turbine engine comprising a vane segment of one form of the present invention.

With reference to FIG. 1, there is illustrated a gas turbine engine 10 which includes a compressor 11, a combustor 12 and a turbine 13. The three components have been integrated together to produce an aircraft flight propulsion engine. It is important to realize that there are a multitude of ways in which the components can be linked together. Additional compressors and turbines can be added with inner coolers connecting between the compressor and reheat combustion chambers to be added between the turbines. Further, the gas turbine engine is equally suited to be used for industrial applications. Historically there has been wide spread applications of industrial gas turbine engines, such as pumping sets for gas, oil transmission lines, electricity generation and naval propulsion.

A turbine nozzle 20 positioned within the gas turbine engine 10 includes a plurality of vane segments 21 that are circumferentially spaced. Each of the vane segments 21 has at least one vane coupled thereto for directing the working fluid to the rotor blades 23 of the rotor in order to extract energy therefrom. The term airfoil will be used herein interchangeable with the term vane.

Figure 2:
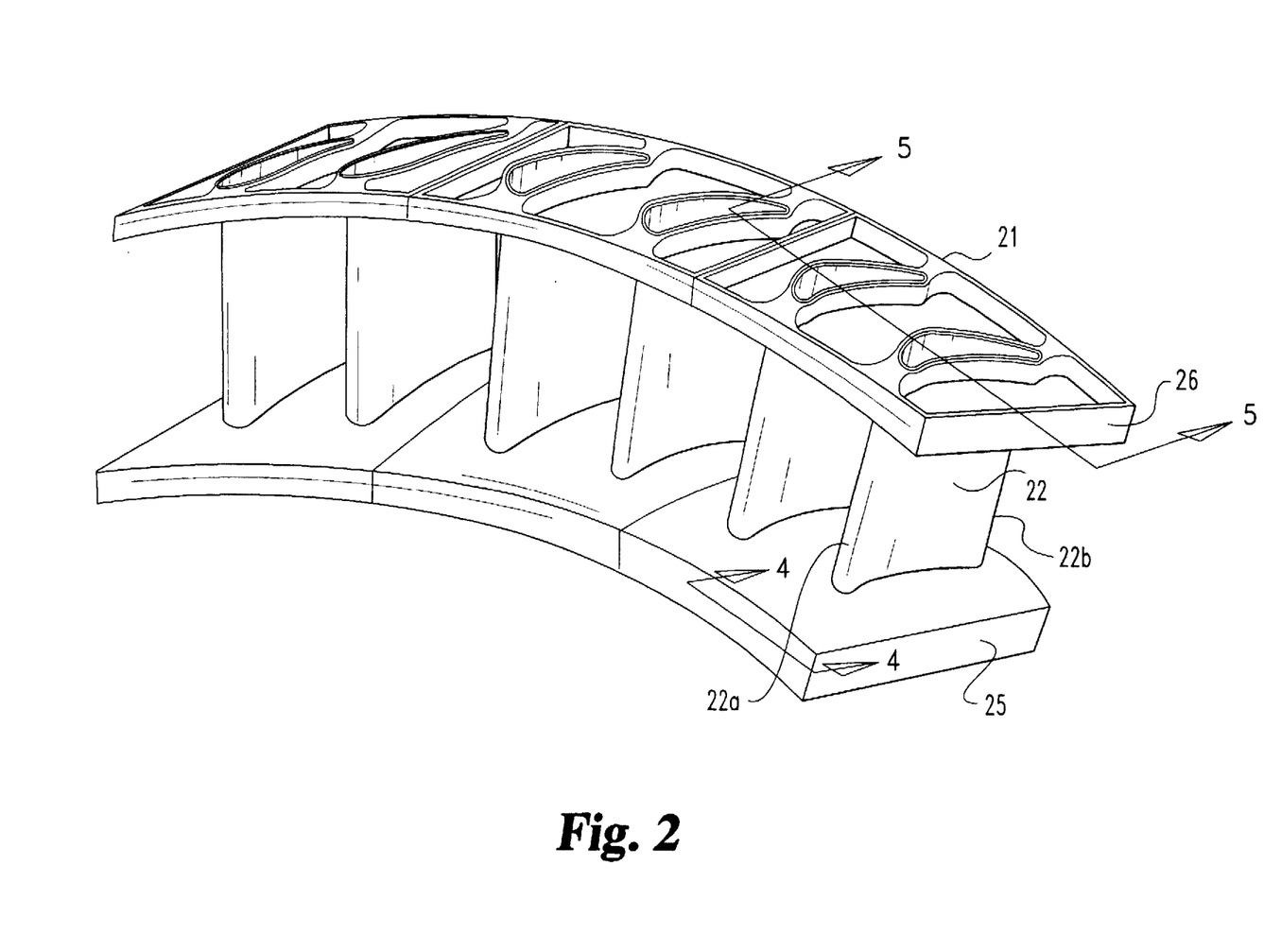
FIG. 2 is a partial perspective view of a plurality of vane segments comprising a portion of the nozzle of FIG. 1.

With reference to FIG. 2, there is illustrated a plurality of circumferentially spaced vane segments 21 that form a portion of the turbine nozzle 20. The plurality of vane segments 21 are conventionally joined together to collectively form a complete 360 nozzle. Each of the vane segments 21 include vanes 22 that are coupled at their first and second ends to endwall members 25 and 26. The embodiment of vane segment 21 illustrated in FIG. 2, has two vanes coupled thereto, however it is contemplated herein that a vane segment may have one or more vanes per vane segment and is not limited to a vane segment having two vanes.

Vane 22 has a leading edge 22a and a trailing edge 22b and an outer surface extending therebetween. The term spanwise will be used herein to indicate an orientation between the first endwall 25 and the second endwall 26. Further, the term streamwise will be used herein to indicate an orientation between the leading edge 22a and the trailing edge 22b.

Figure 3:
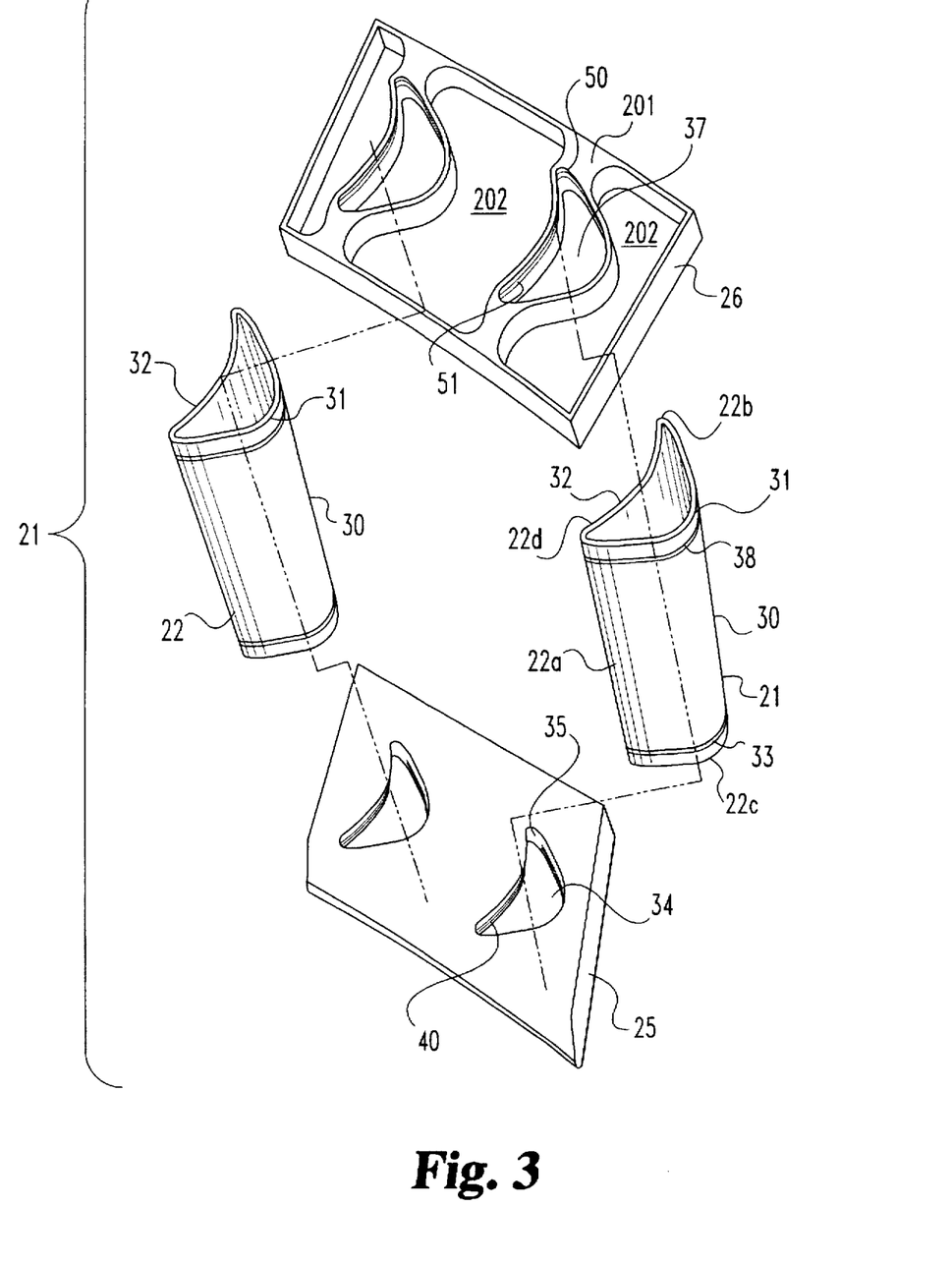
FIG. 3 is an exploded view of a vane segment of FIG. 2.

With reference to FIG. 3, there is illustrated an exploded view of the vane segment 21, which comprises a first endwall 25, a second endwall 26 and a pair of vanes 22 that are coupled to the respective endwalls by retainers formed insitu within the grooves formed in the vanes and endwalls. In the preferred embodiment the first endwall 25 and the second endwall 26 are of a cast structure, however other structures are contemplated herein.

Each vane 22 defines an airfoil having an outer surface 30 extending between the leading edge 22a and the trailing edge 22b. The leading and trailing edges of the vane extend between a first end 22c and a second opposite other end 22d. The vane 22 is generally conventional with the outer surface 30 having a convex suction side 31 and an opposite concave pressure side 32.

In the preferred embodiment the gas turbine engine vane 22 is a hollow cast structure produced by a casting operation utilizing various super alloy compositions. Various types of super alloy compositions, and the manufacturers of such compositions are believed known to those skilled in the art. Super alloy compositions of interest are complicated mixtures of nickel, chromium, aluminum and other select elements. One technique for producing a cast vane 22 having equiaxed, directionally solidified, or single crystal alloy structures is disclosed in U.S. Pat. No. 5,295,530 to O'Connor which is incorporated by reference herein. In the preferred embodiment the vane 22, and the endwalls 25, 26 are of a single crystal and/or directionally solidified alloy structure.

Formed proximate the first end 22c of vane 22 is at least one groove or slot 33 that extends at least in part between the leading and trailing edges 22a and 22b. In one embodiment the groove or slot 33 extends completely around the outer surface 30 of the vane along both sides thereof between the leading and trailing edges 22a and 22b. In a preferred form of the present invention the groove or slot 33 is rectangular or semicircular shaped and has a width or diameter in the range of about 0.050 to 0.100 inches.

First endwall member 25 has an aperture 34 formed therein for receiving the first end 22c of the vane therein. The aperture 34 has a sidewall portion 35 which includes at least one groove or slot 40 that extends substantially colinear with and faces the respective groove 33 in the first end 22c of the vane. Upon positioning of the first end 22c of the vane 22 within the aperture 34 the grooves 33 and 40 are placed in registry. It is understood herein that the grooves in vane 22 and in the first endwall 25 are not necessarily of the same shape and size, however grooves of the same shape and size are contemplated herein. In one embodiment the grooves 33 and 40 extend completely around the surface that they are formed in.

In referring to FIG. 3 it is illustrated that the second endwall member 26 has an aperture 37 therethrough. In one embodiment reinforcing ribs 201 are formed around the apertures 34 and 37. While the endwall 26 has been shown with material removed from a portion 202, it is understood that endwall members without material removed from portions 202 are contemplated herein. Aperture 37 has a sidewall portion 50 which includes a groove or slot 51 that extends substantially colinear with and faces the groove or slot 38 in the second end 22d of vane 22. The endwall member 26 and the second end 22d of vane 22 are substantially similar to the first endwall member 25 and the first end 22c of vane 22. Further, second end 22d of vane 22 is aligned and coupled to the second endwall member 26 in a manner substantially identical to the first endwall member 25 and the first end 22c of vane 22.

In another form of the present invention the ends 22c and 22d of the vanes each include at least one groove or slot 33 and 38 respectively that extend around a portion of the outer surface 30. It is preferred that the groove or slot 33 and 38 respectively extend between the leading edge 22a along both sides of the vane to a position spaced proximate from the trailing edge 22b. The position where the groove or slot 33 and 38 respectively terminates as measured from the trailing edge 22b is in the range of about twenty to forty percent of the length of the vane. More preferably, the groove or slot 33 and 38 respectively terminate at a position as measured from the trailing edge 22b of about ⅓ of the length of the vane. It is understood herein that in this form of the present invention the groove or slot 33 and 38 do not extend completely around the outer surface 30 of the vane and the absence of the groove or slot 33 and 38 in a portion of the vane 22 proximate the trailing edge 22b allows for the movement/floating of the trailing edge portion of the vane relative to the endwall members 25 and 26 in response to thermal conditions. In another form of the present invention, the coupling of the ends 22c and 22d of the vane 22 to the respective endwall members is different so that one end is allowed to move/float and the other end is not allowed to move/float relative to the endwall member.

Figure 4A:
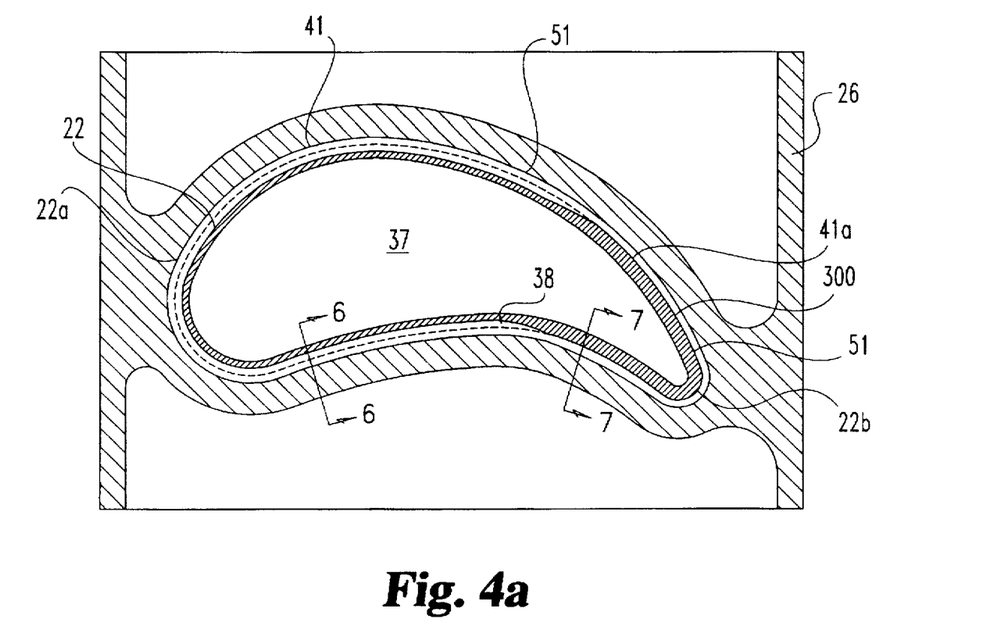
FIG. 4a is a sectional view of FIG. 2 taken along line 4—4.

With reference to FIG. 4a there is illustrated a sectional view taken along lines 4—4 of FIG. 2 showing the second end 22d of the vane 22 coupled to the second endwall member 26. The second end 22d of vane 22 has a groove 38 formed therein that extends from the leading edge 22a on both surfaces to a location proximate the trailing edge 22b of the vane. A groove 51 is formed in the aperture 37 of the second endwall member 26 for receiving a retainer 41 to couple the vane and endwall together. Groove 51 extends completely around the wall defining the aperture 37. The retainer 41 is formed insitu and is preferred to fill the grooves within the respective components about one hundred percent. In the preferred embodiment the retainer 41 is cast or forged into the grooves when they are in registry and does not form a metallurgical bond, so as to form a removeable retainer. The termination of the groove 38 in the vane prior to the trailing edge 22b allows for a portion of the vane 22 to be moveable relative to the endwall in response to thermal conditions. A mechanical seal 41a forming a portion of the retainer 41 extends from the groove 51 and abuts a portion 300 of the surface of the vane 22 that is adjacent the groove 51. This portion 300 of the surface of the vane 22 does not have a groove formed thererin.

Figure 4B:
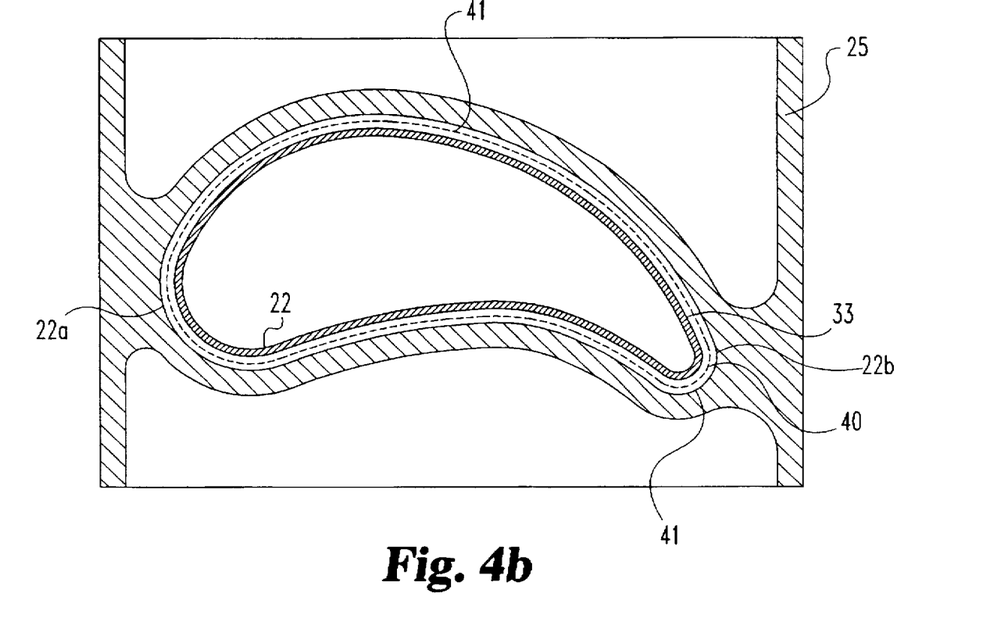
FIG. 4b is a sectional view of an alternative embodiment of the vane segment of FIG. 2 taken along line 4—4.

With reference to FIG. 4b, there is illustrated an alternative embodiment of the present invention taken along line 4—4 of FIG. 2. The vane 22 has a groove 33 formed therein and the first endwall member 25 has a groove 40 formed therein that are substantially in register. A retainer 41 is formed within the adjoining grooves to couple, but not metallurgically bond, the vane 22 to the first endwall member 25. The retainer 41 is formed insitu and is preferred to fill the grooves within the respective components about one hundred percent. In the preferred embodiment the retainer 41 is cast or forged into the grooves when they are in registry so as to form a removeable retainer. A substantially identical retainer 41 is formed within the grooves 38 and 51 so as to couple the second endwall member 26 with the second end 22d of the vane 22.

Figure 5:
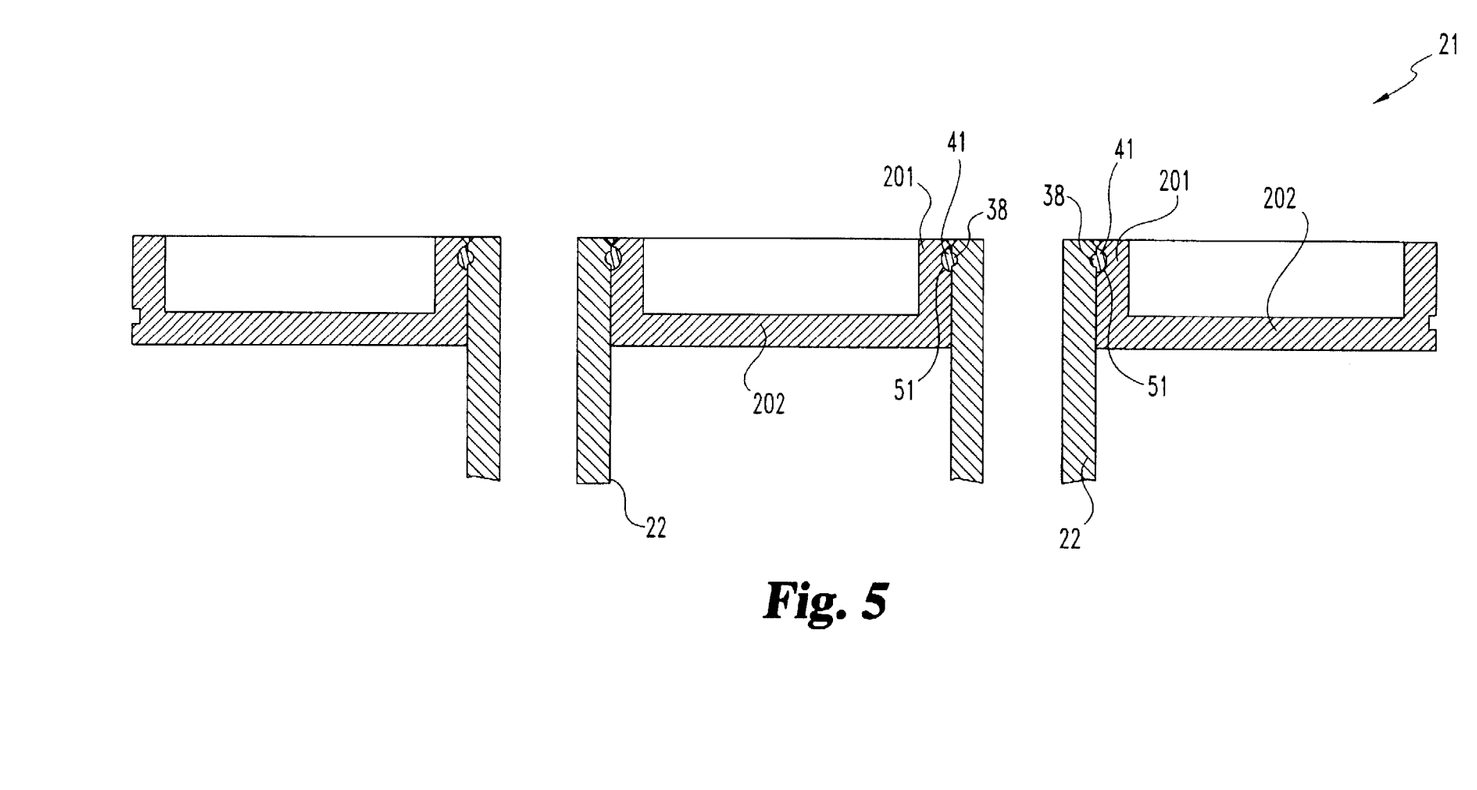
FIG. 5 is a sectional view of FIG. 2 taken along line 5—5.

With reference to FIG. 5, there is illustrated a cross sectional view of the vane segment 21 taken along lines 5—5 of FIG. 2. The vane 22 is positioned within aperture 37. The retainer fills the grooves 51 41 and 38 so as to mechanically couple the endwall member 26 with the vanes 22. The retainer 41 further functions to fill the grooves so as to provide a substantially fluid tight seal for minimizing and/or preventing the leakage of fluid therethrough.

Figure 6A:
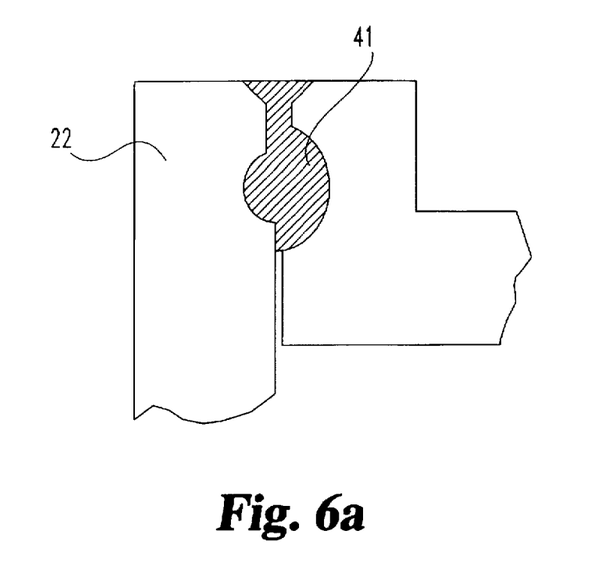
FIG. 6a is a partial sectional view of FIG. 4a taken along line 6—6, comprising one form of the retainer coupling an endwall with an airfoil.
Figure 6B:
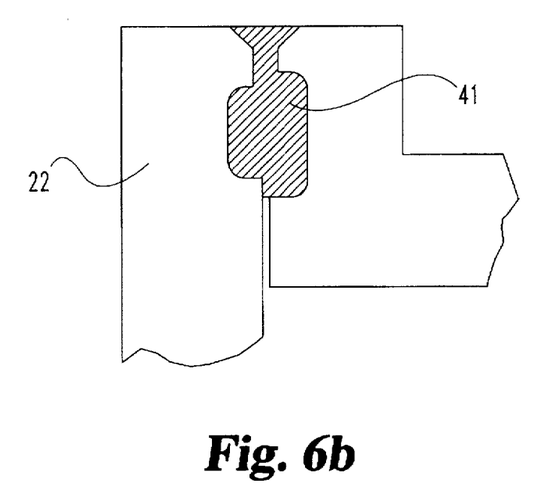
FIG. 6b is a partial sectional view of FIG. 4a taken along line 6—6, comprising another form of the retainer coupling the endwall to the airfoil.
Figure 6C:
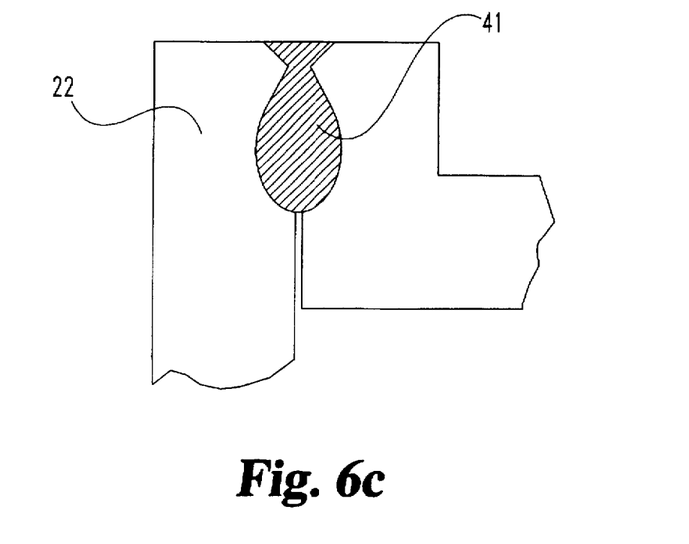
FIG. 6c is a partial sectional view of FIG. 4 taken along line 6—6, comprising another form of the retainer coupling an endwall to an airfoil.
Figure 6D:
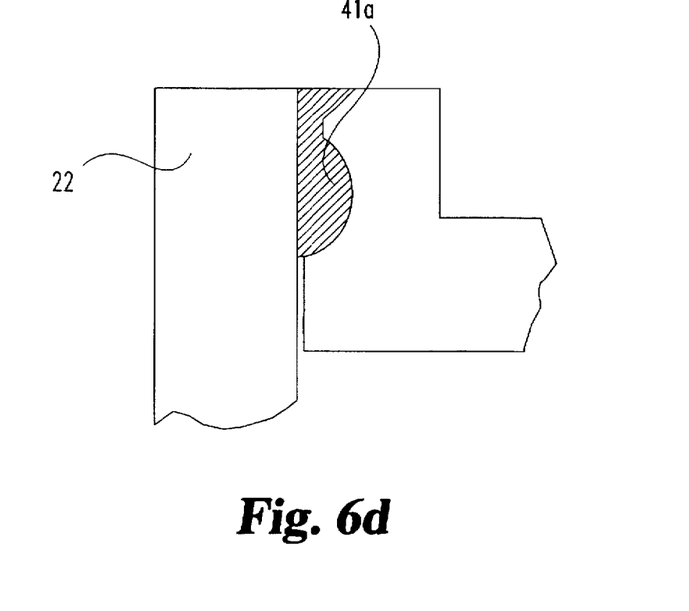
FIG. 6d is a partial sectional view of FIG. 4 taken along line 7—7, comprising a seal disposed between an endwall and an airfoil.

With reference to FIGS. 6a, 6b and 6c, there are illustrated three sectional views of retainers that can be utilized to couple the vane with the respective endwalls It is understood herein that the shapes and geometric configurations associated with the retainers are illustrative and other shapes and geometric configures are contemplated herein. Further, in the preferred embodiment the retainer 41 is a cast structure that is not metallurgically bonded to the vane and/or endwall. The retainer 41 being an air cast or vacuum cast component. In an alternative embodiment the retainer 41 is a forged structure that is forged in place between the vane and endwall and does not metallurgically bond to the respective parts. The retainer 41 is able to be removed from the vane segment without damaging the components forming the assembly. Preferably the retainer 41 fills the volume of the grooves one hundred percent in order to minimize fluid leakage With reference to FIG. 6d there is illustrated a sectional view of the seal 41a forming a portion of the retainer 41. The seal 41a extends from the groove in the endwall and abuts a portion of the outer surface of the vane. It is contemplated herein that the seal could be reversed such that the groove is formed completely around vane 22, and the corresponding groove in the endwall member stops at a location spaced proximate from the trailing edge of the vane. Thus the seal in the alternate embodiment extends from a groove in the vane and abuts a portion of the wall defining the aperture.

With reference to FIGS. 1–6b a method of assembling and/or repairing a vane segment will now be described. A typical vane segment 21 is assembled from its piece part components which comprise at least one vane 22, a first endwall 25, a second endwall 26 and a suitable retainer. Each end of the vane 22 is positioned within the respective recesses in the endwalls 25 and 26 such that the grooves in the vane 22 are in substantial registry with the respective grooves in the endwall members. The respective components, in one embodiment, have been preoxidized so as to prevent the formation of a metallurgical bond therebetween. A metal alloy material is cast or forged into the grooves so that a retainer is formed that couples the vanes 22 with the endwalls. The metal alloy is preferably a nickel or cobalt super alloy; the materials include, but are not intended to be limited herein to, Mar-M247 or X40 for cast retainers, and a material such as WASPALLOY for a forged retainer. Preferably, the retainer as formed fills the grooves one hundred percent so as to provide a substantially fluid tight seal. In the event it is necessary to repair the vane segment 21 the retainer is removed from the vane segment to allow the endwall members and vane to be separated. Removal of the retainer 41 is accomplished without damaging the endwalls or vanes 22 through conventional techniques including chemical and electro-discharge machining. The defective or damaged part is then removed and replaced with a corresponding replacement part and the endwalls and vane are recoupled by the above manufacturing technique.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A gas turbine engine vane, comprising:
    an airfoil having an outer surface extending between a leading edge and a trailing edge and between a first end and an opposite other second end;
    an endwall positioned proximate one of said ends; and
    a retainer formed insitu and extending between said airfoil and said endwall for coupling said airfoil with said endwall, said retainer abutting but not bonded to said endwall and said airfoil.

2. The vane of claim 1, wherein said retainer is cast.

3. The vane of claim 1, wherein said retainer is forged.

4. The vane of claim 1, wherein said endwall has an aperture therein for receiving said one of said ends therein, and wherein said retainer positioned so as to abut the portion of said airfoil extending into said aperture.

5. The vane of claim 4, wherein said endwall has reinforcing ribs proximate said aperture.

6. The vane of claim 1, wherein said airfoil is a cast structure.

7. The vane of claim 6, wherein said endwall is a cast structure, and wherein said airfoil is substantially hollow.

8. The vane of claim 1, wherein:
said endwall is a cast structure formed of a superalloy having an aperture formed therein;
said airfoil is hollow cast structure formed of a superalloy; and
said retainer abutting a portion of said airfoil that is positioned within said aperture, and said retainer is of a metal material.

9. The vane of claim 8, wherein said airfoil and endwall are of a single crystal alloy structure.

10. The vane of claim 9, wherein said retainer is cast.

11. The vane of claim 9, wherein said retainer is forged.

12. The vane of claim 8, wherein said airfoil and said endwall are of a directionally solidified alloy structure.

13. The vane of claim 12, wherein said retainer is cast.

14. The vane of claim 12, wherein said retainer is forged.

15. The vane of claim 8, comprising another endwall positioned proximate the other of said ends, and further including retainer formed insitu and extending between said airfoil and said another endwall, said retainer abutting but not bonded to said another endwall and said airfoil, and wherein said endwalls and said airfoil have been preoxidized.

16. The vane of claim 15, wherein said another endwall has an aperture formed therein for receiving the other of said ends therein, said retainer positioned so as to abut a portion of said airfoil extending into said aperture in said another endwall.

17. The vane of claim 16, wherein said airfoil is a hollow casting formed of a superalloy, and wherein said another endwall is formed of a superalloy.

18. The vane of claim 17, wherein said retainers are forged, and wherein said endwalls and said airfoil are of a single crystal alloy structure.

19. The vane of claim 17, wherein said retainers are forged, and wherein said endwalls and said airfoil are of a single crystal alloy structure.

20. The vane of claim 17, which further includes a plurality of airfoils coupled to said endwalls by a plurality of retainers.

21. A gas turbine engine vane, comprising:
a wall member; and
an airfoil having an outer surface extending between a leading edge and a trailing edge and between a first end and an opposite other second end, said airfoil having a first portion and a second portion along one of said ends, said first portion fixedly coupled by a retainer to said wall member and said second portion being moveable relative to said wall member.

22. The vane of claim 21, wherein said retainer is formed insitu.

23. The vane of claim 22, wherein said retainer is cast.

24. The vane of claim 23, wherein said retainer is forged.

25. The vane of claim 22, wherein said retainer has a retaining portion and a sealing portion, said retaining portion couples said airfoil first portion to said wall member, and said sealing portion defining a mechanical seal for abutting said airfoil second portion and said wall member to provide a mechanical seal.

26. The vane of claim 22, wherein said retainer retaining portion extending from said leading edge around said airfoil to a position spaced from said trailing edge.

27. The vane of claim 26, wherein said airfoil has a length, and wherein said retaining portion is spaced from said trailing edge a distance in the range of about 20% to about 40% of said length.

28. The vane of claim 26, wherein said airfoil has a length, and wherein said retaining portion is spaced from said trailing edge a distance of about one third of the length of said airfoil.

29. The vane of claim 21, wherein said second portion is moveable relative to the wall member in response to thermal conditions.

30. The vane of claim 21:
wherein said retainer is formed insitu;
wherein said retainer has a retaining portion for coupling said first portion to said wall member and a sealing portion defining a mechanical seal for abutting said second portion and said wall member to normally provide a mechanical seal, said retaining portion extending from said leading edge around said airfoil to a location spaced from said trailing edge, said location is within a range of about 20% to 40% of the length said airfoil.

31. The vane of claim 21:
which further includes another wall member:
said first end and second end of the airfoil being substantially identical;
which further includes another retainer for fixedly coupling a first portion of said other end of said airfoil to said another wall member and said second portion of said other end being moveable relative to said another wall member; and
wherein said wall members defining an endwall.

32. The vane of claim 31, which further includes a plurality of airfoils, each of said plurality of airfoils being coupled at a first endwall member at a first portion by said retainer and said second portion being moveable relative to said member, and each of said plurality of airfoils being coupled at a second end to said another wall member at a first portion by a retainer and said second portion being moveable relative to said another wall member.

33. A gas turbine engine vane, comprising:
an airfoil having an outer surface extending between a leading edge and a trailing edge and between a first end and an opposite other second end, said airfoil having a first groove therein at one of said ends extending along at least a portion of said outer surface between said leading edge and said trailing edge;
an endwall having a second groove therein, said endwall positioned proximate said airfoil so that said first and second grooves are substantially in registry; and
a retainer filling said grooves and extending between said airfoil and said endwall for coupling but not bonding said airfoil with said endwall.

34. The vane of claim 33, wherein said retainer fills substantially one hundred percent of said grooves.

35. The vane of claim 33, wherein said first and second grooves are rectangular.

36. The vane of claim 35, wherein a width of each said first and second grooves range from about 0.05 inches to about 0.100 inches.

37. The vane of claim 36, wherein the width of said first and second grooves is not equal.

38. The vane of claim 33, wherein said first and second grooves are semi-circular.

39. The vane of claim 38, wherein a diameter of each of said first and second grooves ranges from about 0.05 inches to 0.10 inches.

40. The vane of claim 39, wherein the diameter of one of said grooves is greater than the diameter of the other of said grooves.

41. The vane of claim 33, wherein said endwall has an aperture for receiving one end of said airfoil therein, and wherein said groove formed on a wall member defining said aperture.

42. The vane of claim 41, wherein said second groove extends completely along the wall member defining said aperture.

43. The vane of claim 42, wherein said first groove extends from said leading edge to a position spaced from said trailing edge.

44. The vane of claim 41:
   further including a second endwall having an aperture for receiving the other end of said airfoil therein, and wherein a third groove is formed on a wall member defining the aperture of said second airfoil;
   said other end of said airfoil having a fourth groove therein that extends along at least a portion of said outer surface between said leading edge and said trailing edge;
   said second endwall positioned proximate said other end of said airfoil so that said third and fourth grooves are substantially in registry for receiving a second retainer to fill said third and fourth grooves for coupling but not bonding said airfoil with said second endwall.

45. The vane of claim 44, which further includes a plurality of airfoils coupled but not bonded to said endwalls.

46. A method for assembling a vane segment, comprising:
   providing an airfoil having an outer surface extending between a first end and an opposite other second end and having a first groove therein at one of said ends, further providing a wall member having a second groove therein;
   positioning the wall member and one of the ends of the airfoil so that the first and second grooves are substantially in registry; and
   placing a retainer adaptable to the shape of the grooves within the grooves for coupling but not bonding the airfoil to the endwall.

47. The method of claim 46, wherein said providing includes a second wall member having a groove therein, and which further includes peroxiding the airfoil and the wall member.

48. The method of claim 46, wherein said placing includes casting the retainer insitu.

49. The method of claim 46, wherein said placing includes forging the retainer insitu.

50. The method of claim 46, wherein said placing includes filling the grooves to about one hundred percent with the retainer.

51. The method of claim 46, which further includes obtaining a vane segment that has been run prior to said providing, which further includes separating the airfoil and endwall that are coupled but not bonded prior to said providing, and which further includes selecting the resuseable component prior to said providing.

52. The method of claim 51, wherein said separating includes chemical removal of the retainer from the grooves.

53. The method of claim 51, wherein said separating includes electro-discharge machining of the retainer so as to substantially remove the retainer from the grooves.

* * * * *

UNITED STATES PATENT AND TRADEMARK OFFICE
CERTIFICATE OF CORRECTION

PATENT NO. : 5,797,725
DATED : August 25, 1998
INVENTOR(S) : Jeffrey F. Rhodes

It is certified that error appears in the above-identified patent and that said Letters Patent is hereby corrected as shown below:

In column 5, line 47 should read as follows --The retainer 41 fills the grooves 51 and 38 so as to--.

In column 7, line 28, please insert --another-- before "retainer".

In column 7, line 35, please change the word "forged" to --cast--.

In column 7, line 56, please change the number "23" to --22--.

In column 8, line 34, please insert --wall-- before "member".

In column 9, line 3, please insert --second-- before "groove".

Signed and Sealed this

Twenty-second Day of June, 1999

Attest:

Q. TODD DICKINSON

*Attesting Officer*　　　Acting Commissioner of Patents and Trademarks